UNITED STATES PATENT OFFICE.

ROBERT E. BRIGHT, OF CHICAGO, ILLINOIS, ASSIGNOR TO STEIN-HALL MANUFACTURING COMPANY, OF CHICAGO, ILLINOIS, A CORPORATION OF DELAWARE.

METHOD OF PREPARING STARCH CONVERSION PRODUCTS.

1,411,204.           Specification of Letters Patent.      Patented Mar. 28, 1922.

No Drawing. Original application filed February 7, 1921, Serial No. 443,243. Divided and this application filed December 17, 1921. Serial No. 523,202.

*To all whom it may concern:*

Be it known that I, ROBERT E. BRIGHT, a citizen of the United States, residing at Chicago, in the county of Cook and State of Illinois, have invented a certain new and useful Improvement in Methods of Preparing Starch Conversion Products, of which the following is a full, clear, concise, and exact description.

This application, which is a divisional application of my application Serial Number 443,243, filed February 7, 1921, relates to a process for the manufacture of starch conversion products and has to do more particularly with the manufacture of a starch conversion product comprising a plurality of sugars, which is useful for many purposes in the art and particularly as an addition agent to flour, enabling bakers to produce bread and other flour products of a superior character in an economical manner.

I have found that by subjecting suitable starches or starch bearing materials to the action of heat and a chemical, or chemicals, a series of degradation, or conversion, products, ranging from unaltered starch, through the intermediate products of amylolysis to starch sugars is produced, which products when treated with water have the same fluidity and viscosity with a relatively small amount of water, say two parts, as is required by starch upon the addition of a relatively large amount of water, say approximately fifteen parts. In the form which I at present prefer, the product is a dry, or substantially dry, compound containing approximately thirteen per cent of starch; sixty-two per cent of the intermediate products of amylolysis, which may include such substances as tetra-amylose and hexa-amylose; thirteen per cent of starch sugars, such as maltose, dextrose, iso-maltose, fructose and raffinose, and 0.4 per cent of free acid, together with smaller amounts of other ingredients. This dry, white product, may be suitably mixed with wheat, or other flour, in varying proportions.

The method of using the said product and the functions it performs in the bread-making operation are more fully discussed in my said divisional application and need not be considered here.

For the sake of a concrete example illustrating one way in which my novel flour improver may be manufactured in an especially desirable form, details of a specific procedure within the scope of the broad invention will now be set forth. It is to be understood, however, that the invention is not limited to the precise details described but may be varied within the scope of the appended claims in which the invention is more particularly pointed out.

In manufacturing my improved product from corn starch, in accordance with the process of the invention, the following method of procedure has been found especially desirable in practice. Powdered corn starch is first acidulated with a dilute solution of chemically pure hydrochloric acid. The amount of the chemically pure hydrochloric acid used is from 0.5 to 0.75 per cent of the weight of the starch to be treated; and this amount of the pure acid is diluted with water, before adding it to the starch, to give a solution of about 10° to 11° Baumé. After thoroughly mixing this dilute acid solution with the starch, the acidulated starch is then put into a steam jacketed converter provided with agitating means; and the temperature is raised to about 325° F. by means of steam at 75 to 80 pounds gage pressure supplied to the converter jacket. While it is desirable to raise the mixture to the specified treating temperature as quickly as possible commensurate with obtaining a white product, care must be taken, where a pure white final product is desired, not to turn on the full steam pressure at once. This is because the moisture content of the mixture should be practically all evaporated and removed before actual conversion begins; otherwise transformation of the moisture into steam and active conversion would proceed simultaneously, resulting in darkening the color of the final product.

Heating and agitating of the acidulated starch at approximately 325° F. is continued for a period of time varying in practice from about one hour to one hour and fifteen minutes, or until a test sample of the product shows a water solubility of from 50 to 60 per cent; a product answering to these identifying characteristics being particularly desirable as hereinbefore pointed out. Where a lower or higher content of starch sugars, and a corresponding lower or higher degree of water solubility is sought, the time of treatment is correspondingly reduced or increased. A higher degree of solubility and a higher starch sugar content can also be obtained by increasing the amount of acid used and employing a higher treating temperature. In any case, the progress of the conversion or degradation of the starch is carefully observed by taking frequent test samples for examination; and when the proper composition has been obtained, the heating is immediately stopped and the product is cooled as quickly as possible to say 140° F. or lower; after which the product is bolted and packed in barrels and bags for shipment.

The product obtained in carrying out the process, in accordance with the specific procedure above described, by way of a typical example, has the following composition, calculated on a dry basis:

|  | Per cent. |
|---|---|
| Moisture | 5.6 |
| Unaltered starch | 13.4 |
| Intermediate products of amylolysis (such as tetra-amylose and hexa-amylose) | 60. |
| Starch sugars (such as maltose, dextrose, raffinose and other mono- and poly-saccharides) | 15.5 |
| Proteins (N 6,25) | 1.2 |
| Total acidity (as lactic acid) | 0.38 |
| Fat | 0.37 |
| Ash | 0.27 |
| Fibre | 0.48 |

As before stated, the specific example of the novel process and product hereinbefore given are merely illustrative and explanatory, and various changes in detail may be made without departing from the spirit and scope of the invention.

I claim—

1. The process of amylolysis which comprises treating a substantially dry starch material with hydrochloric acid in an amount equal to one half of one per cent of the material to be treated and diluted to a specific gravity of approximately 11° Baumé, subjecting the material, so treated, to heat until substantially all of the water content is driven off, and continuing the heating at a higher temperature until a substantially dry product having a sugar content of upwards of six per cent mono- and poly-saccharide sugars, is obtained.

2. The process of amylolysis which comprises treating a substantially dry starch material with hydrochloric acid in an amount equal to one half of one per cent of the material to be treated and diluted to a specific gravity of approximately 11° Baumé, subjecting the material, so treated, to heat until substantially all of the water content is driven off, and continuing the heating at a higher temperature until a substantially dry product having a sugar content of mono- and poly-saccharide sugars, is obtained.

3. The process of amylolysis which comprises treating a substantially dry starch material with hydrochoric acid in an amount equal to one half of one per cent of the material to be treated and diluted to a specific gravity of approximately 11° Baumé, subjecting the material, so treated, to heat until substantially all of the water content is driven off, and continuing the heating until a substantially dry product having a sugar content of upwards of six per cent mono- and poly-saccharide sugars, is obtained.

4. The process of amylolysis which comprises treating a substantially dry starch material with dilute hydrochloric acid in an amount approximately five per cent of the material to be treated, subjecting the material, so treated, to heat until substantially all of the water content is driven off and continuing the heating at a higher temperature until a substantially dry product having a sugar content of mono- and poly-saccharide sugars, is obtained.

5. The process of amylolysis which comprises treating a substantially dry starch material with dilute hydrochloric acid in an amount approximately five per cent of the material to be treated, subjecting the material, so treated, to heat until substantially all of the water content is driven off and continuing the heating until a substantially dry product having a sugar content of upwards of six per cent mono- and poly-saccharide sugars, is obtained.

6. The process of amylolysis which comprises treating a substantially dry starch material with hydrochloric acid in an amount equal to one half of one per cent of the material to be treated and diluted to a specific gravity of about 11° Baumé and subjecting the material to a temperature of substantially 325° Fahrenheit until a sugar content of mono- and poly-saccharide sugars, is obtained.

7. The process of amylolysis which comprises treating a substantially dry starch material with dilute acid in an amount approximately five per cent of the material to be treated, subjecting the material, so treated, to heat until substantially all of the water content is driven off and continuing the heating at a higher temperature until a substantially dry product having a sugar content of upwards of six per cent of mono- and poly-saccharide sugars, is obtained.

8. The process of amylolysis which comprises rapidly bringing a substantially dry, suitable starch material to a temperature of substantially three hundred and twenty-five degrees Fahrenheit in the presence of an acid in an amount equal to approximately one half of one per cent of the material to be treated and diluted to a specific gravity of approximately eleven degrees (11°) Baumé, and maintaining the material at approximately such temperature for upwards of one hour, to produce a substantially dry product containing mono- and poly-saccharide sugars.

In witness whereof I hereunto subscribe my name this 15th day of December, A. D. 1921.

ROBERT E. BRIGHT.